July 28, 1970 C. E. BRADDOCK 3,522,005
PROCESS AND APPARATUS FOR MANUFACTURE OF CARBON BLACK
Filed Feb. 28, 1968 3 Sheets-Sheet 2

INVENTOR
CHARLES E. BRADDOCK
BY
ATTORNEY

July 28, 1970   C. E. BRADDOCK   3,522,005
PROCESS AND APPARATUS FOR MANUFACTURE OF CARBON BLACK
Filed Feb. 28, 1968   3 Sheets-Sheet 3
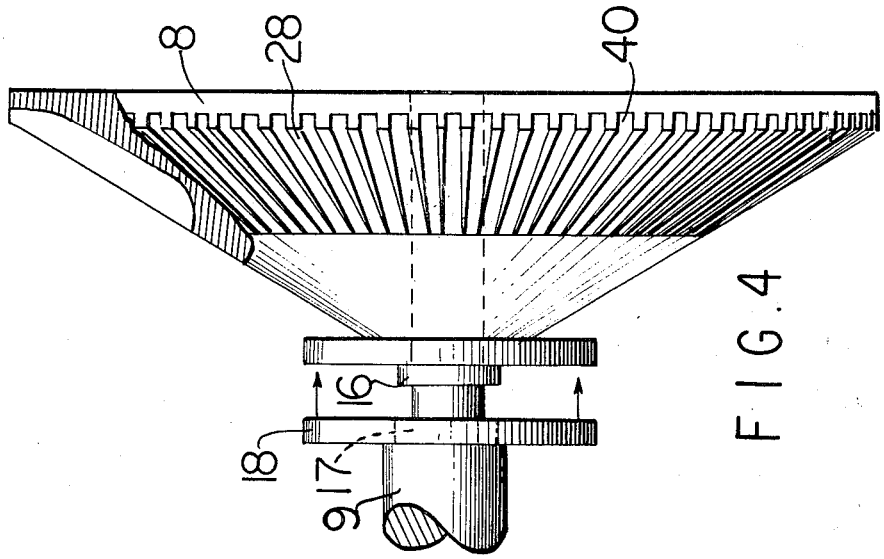
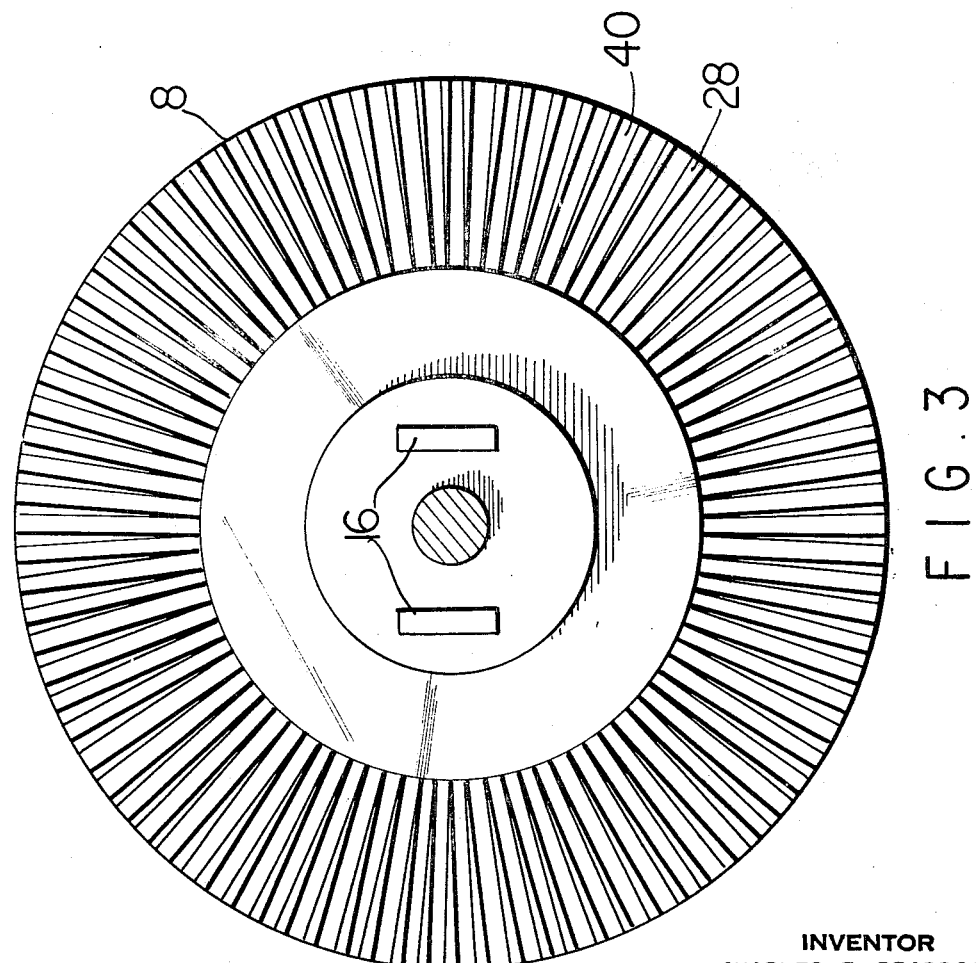
INVENTOR
CHARLES E. BRADDOCK
BY
ATTORNEY

United States Patent Office 3,522,005
Patented July 28, 1970

3,522,005
PROCESS AND APPARATUS FOR MANUFACTURE OF CARBON BLACK
Charles E. Braddock, El Dorado, Ark., assignor to Cities Service Company, a corporation of Delaware
Filed Feb. 28, 1968, Ser. No. 709,038
Int. Cl. C09b 1/50
U.S. Cl. 23—209.4        16 Claims

ABSTRACT OF THE DISCLOSURE

A liquid feedstock hydrocarbon is atomized into hot combustion gases contained by a furnace chamber for vaporization and subsequent thermal decomposition of the hydrocarbon, thus forming carbon black. More specifically, the liquid feedstock hydrocarbon is injected into the furnace chamber by means of a rotating atomizer which considerably enhances dispersion, vaporization and thermal decomposition of the hydrocarbon so that the carbon black may be produced at higher rates and yields.

BACKGROUND OR THE INVENTION

Field of the invention

The present invention is an improvement in carbon black manufacturing processes in which a liquid feedstock hydrocarbon, e.g. a high molecular weight, highly aromatic petroleum or creosote oil, is atomized and distributed into hot combustion gases contained by an elongated furnace chamber wherein the hydrocarbon is vaporized and converted into carbon black by absorption of heat from the gases. Generally, the hot combustion gases are formed within one end of the furnace chamber by combustion of a fluid fuel with a free oxygen-containing gas, e.g. natural gas and air. The liquid feedstock hydrocarbon is atomized into the same end of the chamber so that the droplets are rapidly vaporized and the carbon black is formed as the mixture of hydrocarbon vapor and hot combustion gases courses the length of the chamber. After formation, the carbon black is recovered by conventional means, e.g. cyclone separation, bag filtration, or a combination thereof. Carbon black is, of course, a useful product which may be utilized in various compounds for improving the properties thereof. It may, for instance, be employed as a reinforcing filler for rubber or as a pigment for inks or paints.

Description of the prior art

In the prior art processes to which the present invention pertains, the liquid feedstock hydrocarbons have been projected into the furnace chamber for dispersion within the hot combustion gases by means of single fluid or multiple fluid atomization nozzles. Such atomizers have no moving parts and atomization and dispersion of the hydrocarbon depends solely upon momentum imparted to the liquid by pressurization of the one or more fluids which are projected through the discharge orifice of the atomizer. While atomizers of this general type have been effectively used for quite some time, they have nonetheless left much to be desired as regards ideal atomization and dispersion of the hydrocarbon feedstock liquid in carbon black manufacturing processes. The feedstock hydrocarbon is atomized into rather coarse droplets, e.g. 300–400 microns at best, and they may be nonuniform in size. Some of the droplets may, in fact, be so large as to transverse the body of hot combustion gases before they can vaporize and they consequently impinge upon an opposing wall of the furnace chamber. In such cases, coke will form at the impingement site so that the carbon-forming operation is seriously interfered with, and as often as not, the operation must be shut down to rid the furnace of the coke. Furthermore, the production rate of carbon black which is available from any given furnace has been restricted by the amount of liquid feedstock hydrocarbon which can be effectively atomized, within practical limits, by means of nozzles which are fully dependent upon fluid pressure for atomization of the liquid hydrocarbon. Prior to this invention, the throughput rate and yield of carbon black from any particular furnace could not be pronouncedly increased above previously established maximum values without adversely affecting the quality of the carbon black being produced, or coking the furnace.

SUMMARY OF THE INVENTION

The present invention resides within the discovery that a rotating atomizer member may be employed for injecting a liquid feedstock hydrocarbon into a furnace reaction chamber and thereby greatly improve atomization of the hydrocarbon and enhance the dispersion, vaporization and thermal decomposition thereof within the hot combustion gases contained by the furnace. Accordingly, the yield and production rate of a particular grade of carbon black may be increased to an amazing degree while also providing trouble-free operation and lower manufacturing cost.

By utilizing the present invention, the liquid feedstock hydrocarbon used in a furnace black manufacturing process may be atomized into smaller and more uniformly sized droplets which become more homogeneously distributed throughout the heat-supplying combustion gases within the furnace reaction chamber. Consequently, the droplets of atomized feedstock hydrocarbon are more quickly and uniformly heated so that the vaporization and decomposition rates of the injected hydrocarbon are significantly increased.

This invention is not specifically restricted to any particular furnace black manufacturing process since it may be adapted to almost any such process wherein the feedstock hydrocarbon is injected into the furnace chamber as an atomized spray of liquid droplets which become distributed within hot combustion gases for vaporization and thermal decomposition of the hydrocarbon. The time-honored principle of preventing impingement of unvaporized droplets of the liquid hydrocarbon upon the furnace chamber walls must still be observed, but it will again be emphasized that the problem of furnace coking is greatly alleviated by the present invention, and especially when the hydrocarbon is injected into the furnace through substantially the same path of projection as may have been previously employed with conventional atomization nozzles.

The invention has been employed to particular advantage in furnace carbon black processes wherein a rapidly swirling, highly turbulent mixture of hot combustion gases and feedstock hydrocarbon is first formed within an enlarged, circular section of the furnace chamber and is then passed into an elongated section of smaller diameter for completion of the carbon-forming reaction. Such processes are described in U.S. Pats. 3,079,236 and 3,046,096. In those processes the feedstock hydrocarbon is projected outwardly from an axially positioned atomizer nozzle so that the atomized droplets enter the body of the spiraling hot gases adjacent the furnace chamber wall rather than the eye of the spiral which resides along the center line of the chamber. Thus, the carbon black is formed within the body of the spiral of hot gases as the mixture of gases and thermally decomposing feedstock hydrocarbon courses the length of the furnace barrel.

It is, however, also within the scope of this invention to atomize the feedstock hydrocarbon into the eye of a turbulent spiral of hot combustion gases for formation of carbon black therein and into a relatively nonturbulent body of combustion gases to accomplish formation of the carbon black in a quiescent atmosphere. Respective examples of processes of these general types can be found in U.S. Pats. 2,564,700 and 3,301,639.

In carrying out the present invention, a flowing stream of the liquid feedstock hydrocarbon is fed to an atomizer assembly having a rotating member located within the furnace chamber. The liquid hydrocarbon stream is passed to the rotating member for the purpose of supplying a circular component of motion to the stream so that the momentum thereof may be very greatly increased beyond the momentum of the liquid when it first reaches the rotating member. By this technique centrifugal force is employed to augment the momentum, and thus the shear, of the liquid stream as it is released into the hot gases contained by the furnace chamber. In addition, rotation of the member itself greatly facilitates shear of the hydrocarbon by the fact that gaseous drag upon the separating liquid effectively shatters the stream into many tiny droplets at the interface between the rotating member and the surrounding gaseous body. Therefore, by use of the rotating atomizer member, the shear forces which result in atomization of the liquid stream may be considerably magnified beyond the shear forces which result from mere pressurization of the stream through a conventional atomizing nozzle, and the liquid may thus be converted into a very finely atomized fog of particles, e.g. 150 microns, or less, in diameter. Accordingly, the rotating member should be constructed and rotated at a speed which accelerates the liquid hydrocarbon to at least three times the acceleration of gravity as it separates from the member, the acceleration being determined as follows:

$$\frac{3.1416 \times D \times \text{r.p.s.}}{32.2 \text{ ft./sec./sec.}}$$

where D is the diameter of the rotating member and r.p.s. is the revolutions per second of the member. More particularly, the rotating member should be constructed and operated under conditions which provide an acceleration of about 3 to 40 times the acceleration of gravity to the liquid as it separates from the member. Thus, where a rotating member having a four inch diameter is rotated at a speed of 6,000 r.p.m., it provides an acceleration of about 3 times gravity. Accordingly, a 6 inch diameter member provides an acceleration of about 40 times gravity when rotated at 12,000 r.p.m. Other conditions may be employed to provide equivalent or even greater acceleration values to the feedstock liquid when it is preferable and practical to do so. Atomizing members having a diameter of four to eight inches are generally preferred.

The rotating member of the atomizer assembly may take a variety of forms. It may, for instance, comprise a series of radially extending channels fed from a central point or it may be a radially fed annular conduit, or equivalent, having a series of peripheral discharge orifices for the liquid hydrocarbon. On the other hand, the member may be a disc, cone, or cup, having a surface onto which the liquid hydrocarbon is deposited while the member is rapidly rotated. To advantage, the rotating member of the atomizer may be arranged in coaxial relationship with the furnace chamber and the rotating member may be adapted for discharging the liquid hydrocarbon droplets radially outward into the hot combustion gases contained by the furnace. Contact of the unvaporized hydrocarbon with the furnace chamber walls may be avoided in the conventional manner: by placing the walls sufficiently remote from the discharge locus of the atomizer and/or injecting the atomized liquid into gases having sufficient momentum to prevent penetration of the droplets to the wall, i.e. the droplets are swept up and entrained within the gas stream before they can reach the wall of the chamber.

In order to facilitate atomization of the liquid feedstock hydrocarbon it may be preheated before being fed to the rotating atomizing member, but the present invention has been employed for atomizing hydrocarbons preheated to only 100°–150° F., yet which must ordinarily be preheated to 300°–350° F. before they can be atomized with conventional nozzles.

Pressure required for feeding the hydrocarbon to the atomizer will vary with the design of the rotating atomizer member. If the liquid is fed from the center to the periphery of a disc, cone, or the like, through radially extending channels, the centrifugal force developed upon the liquid within the channels can actually create sufficient negative fluid pressure within the member to make it essentially self feeding. Contrariwise, open faced atomization members require a positive feed pressure of at least several pounds.

Provisions should be made for preventing coking of the feedstock hydrocarbon on, or in, the rotating atomizing member. The member may be substantially cooled by feeding the hydrocarbon liquid at a temperature which is well below the coking point, by passing a shroud of air over the member, or in some instances by surrounding the member with a water jacket.

BRIEF DESCRIPTION OF THE DRAWINGS

FIG. 3 is a rear view of a rotating atomizer member which may be used with the apparatus of FIG. 2.

FIG. 4 is a side view of the rotating atomizer member of FIG. 3.

DESCRIPTION OF THE PREFERRED EMBODIMENTS

Figure 1:
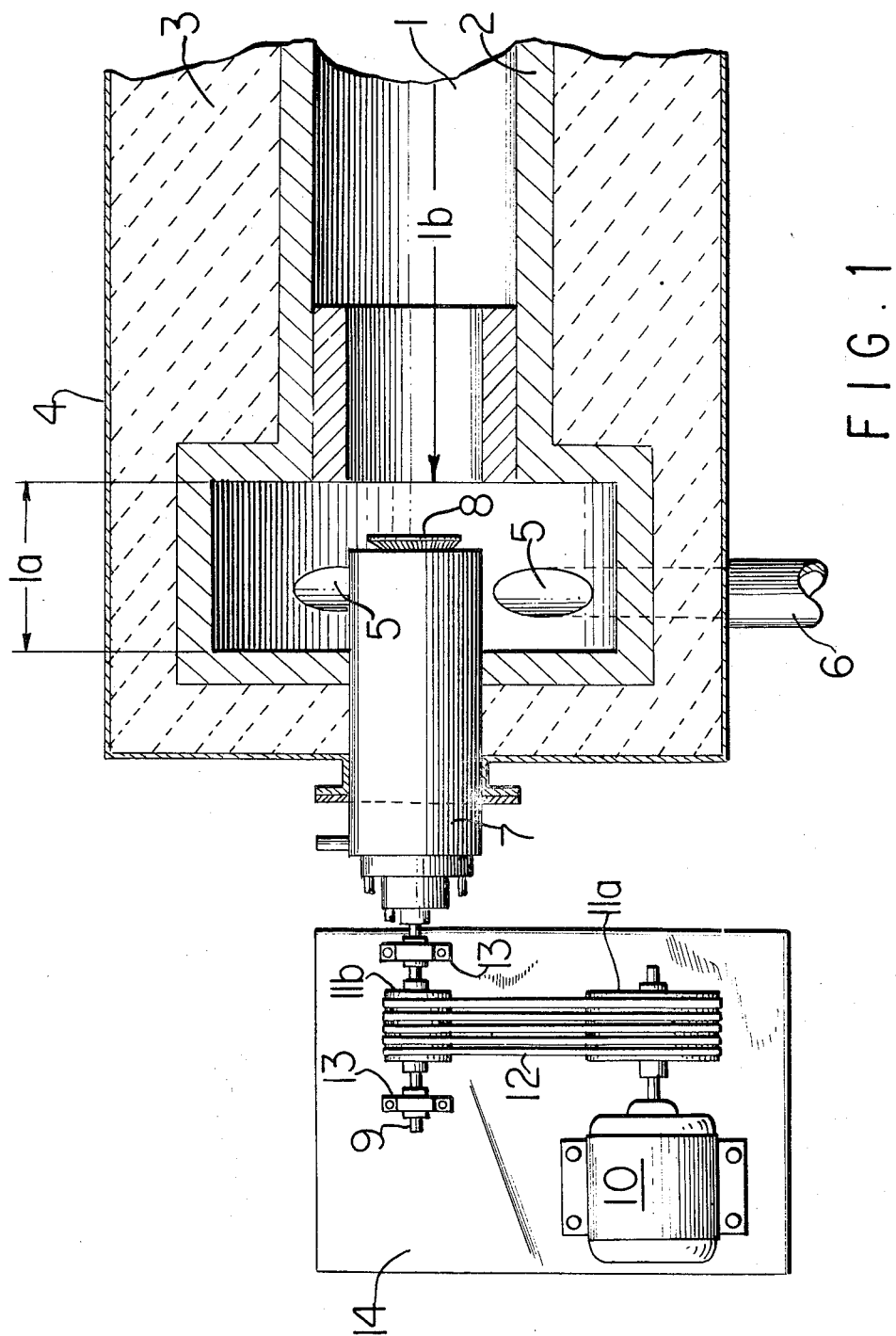
FIG. 1 is a top view of a carbon black furnace having feedstock hydrocarbon atomizing means in accordance with the present invention.

FIG. 1 shows a carbon black furnace having a reaction chamber, generally represented at 1, which is bounded by a dense refractory layer 2. The refractory layer 2 is covered with an insulation material 3 which is in turn enclosed by a metal shell 4. The furnace reaction chamber 1 is of a generally circular cross section throughout, has an enlarged combustion section 1a and an elongated reaction section 1b for thermal decomposition of the hydrocarbon. The combustion section is provided with a series of tangential blast ports 5 whereby a spiral of preformed hot combustion gases and/or a swirling mixture of a fluid fuel and a free oxygen-containing gases is introduced tangentially into the chamber. When a combustible mixture is introduced into the combustion chamber it is burned therein to produce the hot gases. Accordingly, the hot combustion gases or the mixture of combustion gases is fed to the furnace by means of one or more suitable conduits represented at 6. The atomizer assembly, generally represented at 7, extends into the combustion section 1a of the furnace chamber so that the rotating atomizer member 8 is located therein for coaxial relationship with the longitudinal axis of the chamber. The rotating member 8 has an attached shaft 9 so that the member can be rapidly rotated upon activation of the electric motor 10, since the shaft is connected to the motor by means of sheaves 11a and 11b and belts 12. The shaft 9 is supported by means of antifriction bearings 13 which are secured to a mounting plate 14 along with the motor 10.

Figure 2:
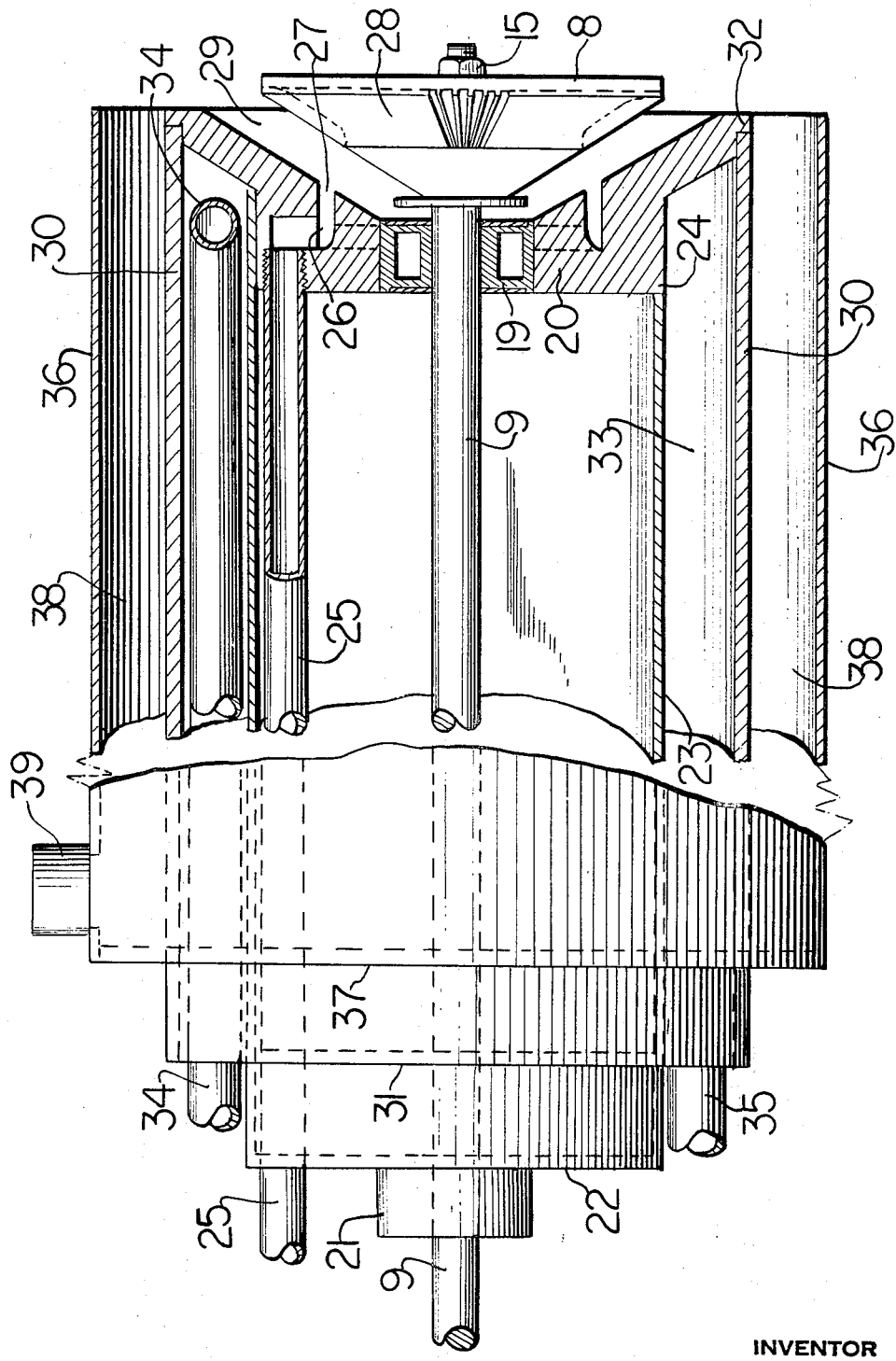
FIG. 2 is a partly sectional side view of a feedstock atomizer assembly which may be used with the apparatus of FIG. 1 for carrying out the process of the invention.

For atomizing the feedstock hydrocarbon into the furnace chamber, an atomizer assembly as shown in FIGS. 2, 3 and 4 may be employed. The rotating member 8 is attached to shaft 9 by means of a nut 15 on the threaded internal end of the shaft and by means of lugs 16 which fit into corresponding detents 17 in the shoulder 18 of the shaft 9. An antifriction bearing 19 is mounted in block 20 for support of the shaft 9 and rotating member 8 at the inner end of the atomizer. For supporting the outer end of the shaft, an antifriction bearing 21 is located on the end plate 22 of the atomizer. End plate 22 is attached to tube 23 which extends for attachment with the inside shoulder 24 of block 20. A supply conduit 25 for the liquid feedstock hydrocarbon extends from outside the atomizer to block 20, the latter having an internal annular groove 26 therein. Liquid discharge orifices 27 project the feedstock hydrocarbon from the orifices 27 onto the internal face 28 of the rotating member 8. Block 20 is chamfered to provide a space 29 between the block and the internal face 28 of the member. A tube 30 is attached at its outer end to end plate 31 and at its inner end to the outer shoulder 32 of block 20 in order to create a water jacket 33 for protecting the shaft 9, bearing 19, block 20 and oil supply conduit 25 from over heating at the inner end of the atomizer which extends into the furnace chamber. Water is supplied to the jacket through conduit 34 and is removed therefrom through conduit 35. Tube 36 extends from end plate 37 to near the end of the atomizer assembly to create an annular space 38 which is open at the inner end thereof. Air is fed to space 38 through conduit 39 so that it discharges from the open end thereof and creates a sheath which protects rotating member 8 from overheating.

One embodiment of the rotating atomizer member 8 is shown in FIGS. 3 and 4. The inside face 28 of the disc, onto which the feedstock hydrocarbon is projected, is provided with a multiplicity of equispaced, radially extending grooves 40 which facilitate atomization of the liquid during rotation of the member.

In operation, hot combustion gases and the feedstock hydrocarbon are charged to the furnace at rates which are necessary for the manufacture of a particular grade of carbon black. After formation, the carbon black is discharged from the downstream end of the furnace chamber 1 into a breeching or cooler and is then separated and collected in a conventional manner. While rotating the member 8, the liquid hydrocarbon is fed onto the face 28 of the rotating member and is atomized by being spun off the member during the high speed rotation thereof. The resultant fog of liquid hydrocarbon droplets then mixes with the spiraling hot gases in the combustion section 1a of the furnace chamber. The hydrocarbon vaporizes therein and subsequently thermally decomposes into carbon black in section 1b of the chamber as the mixture courses the length of the furnace while spiraling rapidly therein.

EXAMPLES

This invention will be compared with a conventional operation for manufacturing carbon black wherein atomization of the feedstock hydrocarbon was accomplished by means of a conventional atomization nozzle. In each operation the furnace was essentially as shown in FIG. 1. The combustion section 1a of the furnace had a diameter of 24 inches and a length of 16 inches. Reaction section 1b had a diameter of 18 inches and a length of 10 feet. The upstream end of the reaction chamber was provided with a choke having an internal diameter of 14 inches and a length of 9 inches.

In the conventional operation, the furnace was heated with hot combustion gas manufactured by burning natural gas with air at the rates of 15,342 s.c.f.h. and 192,645 s.c.f., respectively. A highly aromatic, high molecular weight residue of petroleum was employed as the feedstock hydrocarbon and it was injected into the combustion chamber at the rate of 201 g.p.h. (60°) through a conventional single fluid atomizer having a discharge orifice of 9/32 of an inch. The atomizer projected a hollow cone of droplets at a 60° angle. The tip of the atomizer was positioned coaxially within the combustion section of the furnace 10 inches from the entrance to the reaction section. The feedstock hydrocarbon was preheated to 300° F. and pressurized to 80 p.s.i.g. before being fed to the atomizer. Under these conditions, an HAF carbon black was produced at the rate of 769.8 lbs./hr. The yield of carbon black was 3.83 pounds from each gallon of feedstock hydrocarbon that was fed to the furnace.

In practicing the invention, the same furnace was employed while using a rotating atomizer constructed substantially in accordance with FIG. 2 except that the rotating disc member had a smooth inner surface and 48 ¼-inch equispaced channels extended through the body of the member from near the center to liquid discharge orifices located in the periphery thereof. While rotating the atomizer member at 7000 r.p.m., the feedstock hydrocarbon was passed into the channels and the liquid was atomized as it was spun out of the disc into the combustion chamber of the furnace. The diameter of the disc member was seven inches and it was positioned in the combustion section of the chamber so that the outer face thereof was located eight inches from the inlet to the reaction section of the chamber.

In carrying out this experiment with the rotating atomizer, the furnace was heated by burning natural gas with air at the rates of 11,000 s.c.f.h. and 165,000 s.c.f.h., respectively. 15,000 s.c.f.h. of the air was introduced as a shroud around the rotating atomizer member to keep it from overheating. The same feedstock hydrocarbon was introduced into the furnace at the rate of 285 g.p.h. (60° F.) after having been first preheated to 110° F. and pressurized to 5 p.s.i.g. Most amazingly, an HAF carbon black was produced in this operation at the rate of 1358 lbs. per hour and at a yield of 4.77 lbs. of carbon black from each gallon of feedstock hydrocarbon that was fed to the furnace. These are startling effects in view of the fact that any attempts to produce the same results with a conventional atomizer, by employing equivalent input rates for the feedstock hydrocarbon and hot combustion gases, invariably coked the furnace and produced a much coarser, off-grade carbon black. Thus, the production rate and yield of carbon black on this particular furnace was very pronouncedly increased by use of the invention.

Colloidal tests which were run on the black produced with the conventional and rotating atomizers indicated that particle size and structure of the blacks was equivalent. However, since HAF is a rubber grade of carbon black, it was felt that the quality of the two blacks could best be demonstrated by incorporating each into a rubber compound. The recipe for the compound is shown in Table I. The carbon black was dried for one hour prior to compounding and mixing of the ingredients was accomplished in a Banbury.

TABLE I

| Ingredient: | Parts by weight |
|---|---|
| SBR-1500 polymer | 100.0 |
| Carbon black | 50.0 |
| Zinc oxide | 5.0 |
| Sulfur | 2.0 |
| Benzothiazyl disulfide | 2.0 |
| Stearic acid | 1.5 |

After compounding, the stocks were cured for 25, 50 and 100 minutes at 292° F. and were then subjected to testing. The results of those tests are shown in Table II.

TABLE II

| | Cure | L-300 modulus | Tensile | Elongation | Rebound |
|---|---|---|---|---|---|
| Produced with Conventional Atomizer Nozzle. | 25′ | 2,225 | 3,800 | 490 | |
| | 50′ | 2,600 | 3,875 | 430 | |
| | 100′ | 2,925 | 3,850 | 385 | 55.4 |
| Produced with Rotating Atomizer. | 25′ | 2,425 | 3,840 | 470 | |
| | 50′ | 2,825 | 4,000 | 425 | |
| | 100′ | 3,100 | 3,875 | 385 | 95.6 |

As can be seen from the results of Table II, the carbon black produced with the rotating atomizer provided the desirable characteristic of higher modulus in the rubber compound while imparting a tensile strength which was at least equivalent to the conventionally produced black. Thus, the carbon black produced in accordance with the invention can be considered somewhat better than the conventionally produced black although the latter was a high quality material suitable for compounding into automobile tires.

While the invention has been described herein with respect to particular embodiments thereof, it will be appreciated by those skilled in the art that various changes and modifications can be made without departing from the scope of the invention as hereinafter claimed.

Therefore, what is claimed is:

1. In a process for producing carbon black by thermal decomposition of a liquid hydrocarbon feedstock wherein said feedstock liquid is dispersed within hot combustion gases contained within a furnace chamber by injecting the feedstock into said gases as a spray of liquid droplets, said feedstock being vaporized and decomposed within said furnace chamber by heat absorbed from the hot combustion gases and the carbon black is subsequently separated from the gases and collected, the improved method of dispersing the liquid feedstock hydrocarbon within the hot combustion gases which comprises feeding a flowing stream of the liquid feedstock hydrocarbon to a rotating atomizer member located within said furnace chamber, augmenting the momentum of said hydrocarbon stream by imparting an accelerated component of circular motion to the stream by rapid rotation of said atomizer member, and releasing the liquid hydrocarbon from the atomizer member into the furnace chamber as a fog of atomized liquid droplets.

2. The process of claim 1 in which the atomized fog of liquid hydrocarbon droplets is discharged radially outward into the furnace chamber from a locus which is along the center line of the furnace chamber.

3. The process of claim 2 in which the hot combustion gases are contained by an elongated furnace chamber, the gases travel through the chamber longitudinally as a spiral, and the atomized fog of liquid hydrocarbon droplets is conveyed into the body of the gaseous spiral.

4. The process of claim 1 in which the rotating atomizing member accelerates the circular component of motion of the liquid feedstock hydrocarbon to at least about three times the acceleration of gravity as said liquid is released from the member into the furnace chamber.

5. The process of claim 4 wherein the circular component of motion of the liquid feedstock hydrocarbon is accelerated to within the range of about three to about 40 times the acceleration of gravity.

6. The process of claim 1 wherein the feedstock hydrocarbon is a high molecular weight, highly aromatic hydrocarbon.

7. The process of claim 6 wherein the feedstock hydrocarbon is preheated to a temperature within the range of about 100° F. to about 200° F. before being fed to the rotating atomizer member.

8. In a carbon black furnace having a heat insulated chamber for containing hot combustion gases wherein a liquid feedstock hydrocarbon is dispersed, vaporized and thermally decomposed to form carbon black, means for introducing the hot combustion gases into said chamber and an outlet for removing the carbon black in gaseous suspension from the furnace chamber, the improvement of an atomizer for dispersing the liquid feedstock hydrocarbon within the hot combustion gases contained by the furnace chamber, said atomizer comprising a rotatable member located within the furnace chamber, said rotatable member being adapted for discharge of an atomized fog of liquid feedstock hydrocarbon droplets when fed to said member during rapid rotation thereof, means for feeding a liquid hydrocarbon to the rotatable member and means for rapidly rotating said member.

9. The apparatus of claim 8 in which the rotatable member is a disc adapted to rotate about an axis which is essentially coaxial with respect to the longitudinal axis of the furnace chamber.

10. The apparatus of claim 9 including means for feeding the liquid feedstock hydrocarbon onto the exterior surface of the disc.

11. The apparatus of claim 10 in which the disc has a series of grooves in the exterior surface onto which the liquid is fed and said grooves extend radially across the surface of the disc to the periphery thereof.

12. The apparatus of claim 9 in which the disc is at least about four inches in diameter.

13. The apparatus of claim 12 in which the disc is within the range of about four to about eight inches in diameter.

14. The apparatus of claim 12 in which the disc is adapted to rotate at a speed within the range of about 6,000 to about 12,000 r.p.m.

15. The apparatus of claim 8 including means for maintaining the atomizer member at a temperature below the coking temperature of the feedstock hydrocarbon liquid.

16. The apparatus of claim 9 in which the disc is adapted for feeding a liquid feedstock hydrocarbon into the center thereof and said disc is provided with a series of radially extending channels for conveying the liquid feedstock to the periphery of the disc.

References Cited

UNITED STATES PATENTS

| | | | |
|---|---|---|---|
| 2,917,370 | 12/1959 | Edminster et al. | 23—209.4 |
| 3,011,872 | 12/1961 | Webster | 23—209.4 |
| 3,046,096 | 7/1962 | Heller et al. | 23—209.4 |
| 3,071,443 | 1/1963 | Bellew | 23—209.4 |

EDWARD J. MEROS, Primary Examiner

U.S. Cl. X.R.

23—259.5